United States Patent Office 3,284,487
Patented Nov. 8, 1966

3,284,487
ADDUCTS OF ORTHOCARBOXYLATES AND ISO-CYANATES AND THEIR PREPARATION
Hanswilli von Brachel, Koln-Sulz, Germany, assignor to Farbenfabriken Bayer Aktiengesellschaft, Leverkusen, Germany, a corporation of Germany
No Drawing. Filed Aug. 24, 1962, Ser. No. 219,118
Claims priority, application Germany, Aug. 29, 1961, F 34,805
14 Claims. (Cl. 260—471)

This invention relates to novel compositions of matter and their method of preparation. More specifically, the inventive concept herein resides in novel isocyanate adducts and their methods of preparation.

It has been known to use isocyanates in the production of polyurethane plastics by reacting them with any chemical compound containing an active hydrogen. The active hydrogen containing compounds of the prior art may be defined as one which gives a positive Zerewitinoff test. This test is used to determine any chemical which when added to a Grignard solution of methyl iodine will liberate methane by decomposition of the Grignard agent. Some compounds containing active hydrogen groups are water, alcohols, phenols, amino groups, both primary and secondary, carboxylic acid groups, hydrogen on certain activated methylene groups, malonic esters and the like. There has been a need in the prior art for diisocyanate compounds which are capable of varied reactions and are particularly adaptable for use as intermediate products. Many of these compositions are used, for example, in the manufacture of pharmaceutical compounds, plant protection agents and dyestuffs. Also there has been a need in the prior art for a convenient process for the production of compounds which are suitable as NCO providing compounds in particular at elevated temperatures.

It is, therefore, an object of this invention to provide novel isocyanate adducts. A further object of this invention is to provide a novel process for the production of isocyanate adducts. A still further object of this invention is to provide novel isocyanate adducts that are useful in the preparation of pharmaceutical compounds, plant protection agents, such as plant growth regulants, herbicides and the like, and dyestuffs. It is still a further object of this invention to provide intermediate products which indicate properties of masked isocyanates. Still a further object of this invention is to provide a novel method for the preparation of polyurethane products.

The foregoing objects and others which will become apparent from the following description are accomplished in accordance with this invention, generally speaking, by providing new compositions of matter obtained by contacting an orthocarboxylic acid ester with a composition containing isocyanate groups in the presence of suitable catalysts. It has been found that orthocarboxylic acid esters will add to isocyanates in the presence of suitable catalysts.

The following specific reaction is given by way of illustration of the general process of this invention.

The following reaction illustrates the process of this invention with reference to a specific embodiment thereof. By using methyl isocyanate and ethyl orthoformate the reaction can be formulated as follows:

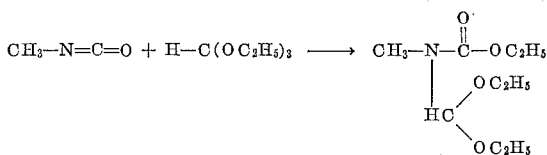

As catalysts, it is possible to use those compounds which are able to polarize the C—O—C bond of the orthocarboxylic acid ester. As such, there are especially to be mentioned Friedel-Crafts catalysts, such as the halides of zinc, cadmium, aluminium, tin, iron, antimony, bismuth, boron or phosphorous.

As isocyanates, it is possible to use aliphatic cyclo-aliphatic or aromatic monoisocyanates and polyisocyanates, and it is also possible to employ those isocyanates which additionally contain hetero atoms or functional groups which are inert with respect to isocyanates, such as halogen, ether, thioether, carbonic ester, sulphone, nitro or nitrile groups. The following isocyanates are to be mentioned by way of example: methyl-, ethyl-, allyl-, n-butyl-, tertiary butyl-, dodecyl-, octadecyl-, oleyl-, cyclohexyl, 1-chlorohexyl, 1-cyno-3-propyl-isocyanates, as well as isocyanato-ethyl acetate, isocyanato-caproate, 8-ethoxy-propyl isocyanate, 1-isocyanato-4,7-dioxaundecane, phenyl-o-, m- and p-toluyl isocyanates, benzyl-, phenyl-ethyl, diphenylmethane-4 - 3,4,6-trichlorophenyl-, nitrophenyl-, chlorophenyl- or m-cyanophenyl isocyanates. Also to be considered are isocyanates of naphthalene or polynuclear ring systems such as 1- or 2-naphthyl- or phenanthryl-3-isocyanates.

The following are to be mentioned as examples of suitable polyisocyanates which can either be used by themselves or in any desired mixture:

Aliphatic diisocyanates of the general formula $$OCN-R-NCO$$

wherein R represents a linear or branched, saturated or unsaturated alkylene radical, which can also be interrupted by hetero atoms, such as oxygen or sulphur. Examples of these are tetra- or hexa-methylene diisocyanates, butene diisocyanates, thiodiethyl- or thiodipropyl diisocyanates, 2,2-dimethyl-pentane diisocyanate, $\omega,\omega'$-dipropylether diisocyanate, 1,12-diisocyanato-4,9-dioxadodecane.

Aliphatic diisocyanates with incorporated ring systems, such as $\omega,\omega'$-diisocyanato-1,3-dimethyl benzene, $\omega,\omega'$-diisocyanato-1,4-dimethyl cyclohexane, $\omega,\omega'$-diisocyanato-1,4-diethyl benzene.

Hydroaromatic diisocyanates, such as cyclohexane-1,3- or cyclohexane-1,4-diisocyanates, 1-methyl cyclohexane-2,4-diisocyanate, dicyclohexyl methane-4,4'-diisocyanate, dicyclohexyl-dimethyl methane-4,4'-diisocyanate or 2,2'-dimethyl dicyclohexyl methane-4,4'-diisocyanate.

Aromatic aliphatic or aromatic hydroaromatic diisocyanates such as 4-isocyanato-phenyl-β-ethyl isocyanate, hexahydrodiphenyl - 4,4' - diisocyanate or hexahydrodiphenyl methane-4,4'-diisocyanate, α(3-isocyanato-phenyl)-ethyl isocyanate.

Diisocyanates of benzene and its homologues such as 1,3- or 1,4-phenylene diisocyanate, 1-alkyl benzene-2,4-, -2,6-, -2,5-, 3,5-diisocyanates, more especially toluylene-2,4- or -2,6-diisocyanate, mixtures of both isomers for examples in the ratio 65:35 or 80:20, 1-methyl-3,5-diethyl benzene-2,4-diisocyanate, diisopropyl benzene diisocyanate.

Diisocyanates of substitution products of benzene, such as 1-chlorobenzene-2,4-diisocyanate, dichlorobenzene diisocyanates, 1-nitro-benzene-2,4-diisocyanate, 1-methoxy-benzene-2,4-diisocyanate, azobenzene - 4,4'-diisocyanate, diphenylether-4,4'-diisocyanate. Diisocyanates of naphthalene such as naphthalene-1,4-, -1,5-, -2,6-diisocyanates. Diisocyanates of diphenyl or of diphenyl methane such as diphenyl diisocyanate, 3,3'-dimethyldiphenyl - 4,4'-diisocyanate, diphenyl methane-4,4'-diisocyanate, diphenyldimethylmethane diisocyanates or benzophenone-3,3'-diisocyanate.

In addition, disocyanates of polynuclear ring systems, sulphur containing aromatic diisocyanates, tri- and tetraisocyanates, such as 1-methylbenzene-2,34-triisocyanate, triphenyl methane-4,4',4"-triisocyanate.

Furthermore, polyisocyanates of high molecular weight and containing urethane groups, for example a triisocyanate obtained by reacting 1 mol of trimethylol propane and 3 mols of toluylene-2,4-diisocyanate and having an NCO content of 19.2%, and isocyanates partially formed in accordance with a perhydrotriazine ring cyclization or isocyanate combinations, for example according to German Patent 951,168, are suitable in accordance with the invention.

As examples of ortho carboxylic acid esters, there are to be mentioned the esters which are derived from aliphatic, cycloaliphatic or aromatic alcohols, such as methanol, ethanol, isopropanol, dodecanol, octadecanol, allyl alcohol, crotyl alcohol, cyclopentanol, cyclohexanol, benzyl alcohol, ethylene glycol, propylene glycol, phenol or cresol and orthocarboxylic acids, such as orthoformic, orthoacetic, orthopropionic, orthoisobutyric, orthobenzoic and orthophenyl acetic acids.

In certain cases, it is also possible to use cyclic orthoesters, such as orthoesters which are derived from ethylene glycol, propylene glycol, butane-1,2-diol, butane-1,3-diol or butane-1,4-diol, cyclohexane-1,2-diol or also those orthoesters such as those formed for example by exchange of the carbonyl oxygen of lactones for two alkoxy groups. The compound of the formula

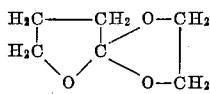

is to be mentioned as an example.

The addition generally takes place at room temperature or moderately elevated temperature, if the catalysts are added to the mixture of the 2 reactants. When using pure reagents, an addition of less than 1% by weight of the catalysts is sufficient to cause the usually exothermic reaction. In order to produce a greater reaction velocity, it may in certain circumstances also be advisable to use a larger quantity of the catalysts, for example up to 10% and more.

After the reaction has taken place, this can easily be recognized from the subsidence of the heat of reaction and the disappearance of the band at 2240–2270 cm.$^{-1}$ which is typical for the NCO group in the infra-red spectrum, the adducts can be freed from the catalysts, for example by distillation, crystallization or chromatography.

The urethanes obtained according to the invention constitute a novel class of compounds, which are capable of very varied reactions and therefore are of particular importance as intermediate products, for example, for the manufacture of pharmaceutical compounds, plant protection agents and dyestuffs. Thus, by partial saponification in the presence of H$^+$ ions, they can be transformed into acyl urethanes. Their alcohol residues are exchangeable and, with compounds containing active methylene groups, the acetal and ketal groups can be condensed.

Any suitable organic compound containing active hydrogen atoms which are reactive with —NCO groups may be used in the saponification process of this invention, such as, for example, water, alcohols, phenols, amino groups, carboxylic acid groups, H atoms on activated methylene groups, hydroxyl polyesters, polyester amides, polyhydric polyalkylene ethers, polyhydric polythioethers, polyacetals and the like. Any suitable hydroxyl polyester may be used such as, for example, the reaction product of a polycarboxylic acid and a polyhydric alcohol. Any suitable polycarboxylic acid may be used in the preparation of the polyesters such as, for example, adipic acid, succinic acid, suberic acid, sebacic acid, oxalic acid, methyl adipic acid, glutaric acid, pimelic acid, azelaic acid, phthalic acid, terephthalic acid, isophthalic acid, thiodiglycollic acid, thiodipropionic acid, maleic acid, fumaric acid, citraconic acid, itaconic acid, benzene tricarboxylic acid and the like. Of course, the corresponding acid anhydrides may also be used. Any suitable polyhydric alcohol may be used in the preparation of the polyesters such as, for example, ethylene glycol, propylene glycol, butylene glycol, hexanediol, bis-(hydroxy methyl cyclohexane), 1,4-butanediol, diethylene glycol, polyethylene glycol, 2,2-dimethyl propylene glycol, xylylene glycol, trimethylol ethane, trimethylol propane, glycerine, pentaerythritol, sorbitol and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, condensates of ethylene oxide, propylene oxide, butylene oxide, amylene oxide, styrene oxide and mixtures thereof. The polyalkylene ethers prepared from tetrahydrofuran may also be used. The polyhydric polyalkylene ethers may be prepared by any known process such as, for example, the process described by Wurtz in 1859 and in the "Encyclopedia of Chemical Technology"; Volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulphide, 4,4'-dihydroxy butyl sulphide, 1,4-(β-hydroxy ethyl) phenylene dithioether and the like.

Any suitable polyester amide may be used such as, for example, the reaction product of an amine and/or amino alcohol with a carboxylic acid. Any suitable amine such as, for example, ethylene diamine, propylene diamine, and the like may be used. Any suitable amino alcohol such as, for example, β-hydroxy ethyl amine and the like may be used. Any suitable polycarboxylic acid may be used such as, for example, those more particularly described above for the preparation of the hydroxyl polyesters. Further, a mixture of a glycol and an amino alcohol of polyamine may be used. Any of the glycols mentioned for the preparation of the polyesters may be used.

Any suitable polyacetal may be used such as, for example, the reaction product of an aldehyde and a polyhydric alcohol. Any suitable aldehyde may be used such as, for example, formaldehyde, paraldehyde, butylaldehyde and the like. Any of the polyhydric alcohols mentioned above in the preparation of the hydroxyl polyesters may be used.

The urethanes obtained according to the invention which are derived from isocyanates and the NCO groups of which are situated in juxtaposition to aromatic nuclei, can be split by heating again into the components, so that these adducts are of significance as agents for splitting off isocyanates.

The invention is further illustrated by the following examples in which parts are by weight unless otherwise specified.

*Example 1*

About 171 grams of methyl isocyanate are quickly added dropwise at about 80–90° C. to about 450 grams of orthoformic acid triethyl ester and about 10 grams of anhydrous zinc chloride, so that the temperature is maintained. When the isocyanate has been added dropwise, the mixture is heated for another hour to 100° C. and the reaction product is distilled off in vacuo. With the subsequent fractionation by means of a column, and after a small first-running of orthoformic acid triethyl ester (about 120 grams), there are obtained about 335 grams of a compound which, by analysis and according to the infra-red spectrum, has the formula

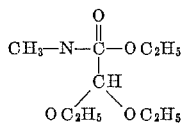

Boiling point 94–96° C./12–14 mm., $n_D^{20}$: 1.4202.

*Analysis.*—$C_9H_{19}O_4N$ calculated: C, 52.8; H, 9.3; N, 6.8; O, 31.2. Found: C, 52.27; H, 9.27; N, 7.58; O, 31.76.

For the partial saponification about 109 grams thereof are quickly heated to 50° C. with about 9.0 grams of water and about 0.1 gram of p-toluosulphonic acid. After distilling off the ethanol (46 grams) in vacuo, there are obtained about 45 grams of N-formyl-N-methyl-ethyl-urethane. Boiling point 72° C./15 mm., $n_D^{20}$: 1.4312.

*Analysis.*—$C_5H_9O_3N$ calculated: C, 45.7; H, 6.9; N, 10.7; O, 36.6. Found: C, 45.8; H, 7.1; N, 11.0; O, 36.3.

Example 2

About 190 grams of orthoformic acid triethyl ester, about 112 grams of propyl isocyanate and about 5 grams of zinc chloride are reacted as described in Example 1. Yield: 200–220 grams, boiling point 108–111° C./12 mm.

*Analysis.*—$C_{11}H_{23}O_4N$ calculated: C, 56.7; H, 9.9; N, 6.0; O, 27.5. Found: C, 56.4; H, 9.9; N, 6.5; O, 27.4.

By partial saponification in a manner similar to Example 1, the N-formyl-N-propyl-ether-urethane. Boiling point 82° C./11 mm. is obtained.

Calculated: C, 52.7; H, 8.2; N, 8.8; O, 30.2. Found: C, 52.5; H, 8.2; N, 9.1; O, 30.2.

For the condensation with ethyl cyanacetate about 46 grams of the adduct are heated with about 24 grams of ethyl cyanacetate and 1 gram of zinc chloride until 16 grams of alcohol have distilled off. The residue is then distilled under high vacuum. Boiling point 126–130° C./0.03 mm., $n_D^{20}$: 1.4970. There are obtained about 25 grams of a compound, the analysis and infra-red spectrum of which correspond to the formula

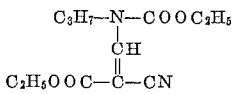

Calculated: C, 56.7; H, 7.1; N, 11; O, 25.2. Found: C, 56.4, 56.6; H, 7.2, 7.4; N, 11.3; O, 25.3.

For the reacetalization, about 46 grams of the adduct are heated with about 13 grams of ethylene glycol, with addition of a trace of p-toluosulphonic acid, until the theoretical quantity of ethanol has distilled over. By fractional distillation, the residue provides about 15 grams of a compound, the infra-red spectrum and analysis of which correspond to the formula

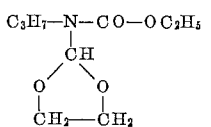

Boiling point 131° C./14 mm., $n_D^{20}$: 1.4440.

Calculated: C, 53.2; H, 8.4; N, 6.9; O, 31.5. Found: C, 53.1; H, 8.6; N, 7.2; O, 30.6.

Example 3

About 110 grams of phenyl isocyanate and about 250 grams of triethyl orthoformate having about 2 grams of zinc chloride added thereto, the mixture being heated to 35–45° C. When the heat of reaction has subsided, the mixture is stirred for another three hours. According to the infra-red spectrum, it is then no longer possible to detect any free isocyanate. By distillation under high vacuum, the adduct can be freed from the catalyst. Boiling point 95–96° C./0.02–0.05 mm., $n_D^{20}$: 1.4917. At temperatures higher than about 100° C., the adduct is split into phenyl isocyanate and orthoformic acid ester.

Calculated: C, 63.0; H, 7.8; N, 5.2; O, 24.0. Found: C, 63.1; H, 7.9; N, 5.9; O, 23.9.

By heating with water and with addition of acid, the adduct can be transformed into N-phenyl-ethyl urethane and alcohol.

Example 4

About 300 grams of triethyl orthoformate and about 230 grams of phenyl isocyanate are mixed together, the catalysts indicated in the following table are added to 30 cc. of this mixture and after standing for 24 hours, the formation of the adduct of Example 3 is proved by infra-red spectroscopy.

| Catalysts in grams | Evaluation of the spectrum |
| --- | --- |
| 0.5 aluminium chloride | No NCO, spectrum completely identical with that of the adduct. |
| 0.5 phosphorous trichloride | About 10% of adduct, remainder starting materials. |
| 0.5 antimony pentachloride | About 80% adduct, remainder starting materials. |
| 1.0 boron trifluoride etherate | About 90% adduct, 10% of starting materials. |
| 0.5 tin-(II)-chloride | No NCO, spectrum completely identical with that of the adduct. |
| 0.5 tin-(IV)-chloride | No NCO, spectrum completely identical with that of the adduct. |
| 0.5 zinc bromide | No NCO, spectrum identical with that of the adduct. |

Example 5

32 grams of orthoformic acid trimethyl ester and 0.3 gram of zinc chloride are added to 100 grams of a 75 percent solution of an adduct of 3 moles of toluylene-(2,4)-diisocyante and trimethylol propane of the formula

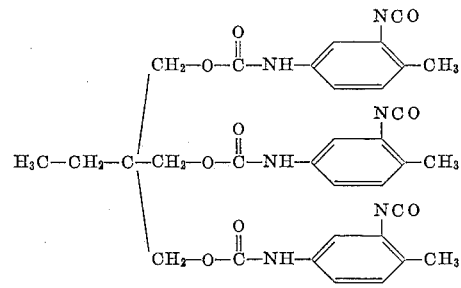

having a NCO-content of 13.2 percent, and the mixture is heated to 45° C. for 4 hours. The adduct thus obtained can be used as a compound yielding isocyanate for cross-linking e.g. hydroxyl group-containing polyesters and polyethers in the production of surface coatings.

By mixing for instance 100 grams of the orthoformic acid ester adduct with 44 grams of a polyester of adipic acid, phthalic acid and trimethylol propane, having the hydroxyl number 300, with the addition of 30–80 grams of ethyl glycol acetate, a surface coating composition is obtained which can be stored for months. After brushing or spraying the surface coating composition can be baked onto sheet iron and glass at 140° C. within a short period. The surface coating thus produced shows good adhesion, is resistant to scratching and resilient.

Although the present invention has been defined specifically with reference to the above noted examples, it should be understood that these examples were given for illustration purposes only. Other variations will become apparent to those skilled in the art upon reading this disclosure. These variations are intended to be included within the scope of this invention.

What is claimed is:
1. A composition having the following general formula:

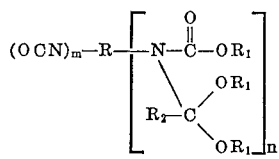

wherein R is selected from the group consisting of aliphatic, cycloaliphatic and aromatic radicals; the $R_1$'s are selected from the group consisting of lower alkyl, cycloalkyl having from 4 to 6 carbon atoms, and mononuclear aryl radicals; $R_2$ is selected from the group consisting of hydrogen, lower alkyl and mononuclear aryl radicals; $m$ is in integer of from 0 to 3; $n$ is an integer of from 1 to 4, and the sum of $m$ and $n$ is equal to the valence of R.

2. The composition of claim 1 wherein $R_1$ is a lower alkyl radical.
3. The composition of claim 1, wherein $R_1$ is a cycloalkyl radical having from 4 to 6 carbon atoms.
4. The composition of claim 1 wherein $R_1$ is a mononuclear aryl radical.
5. The composition of claim 2 wherein $R_1$ is the ethyl radical.
6. The composition of claim 2 wherein R is the propyl radical.
7. The composition of claim 4 wherein R is the phenyl radical.
8. The composition having the formula:

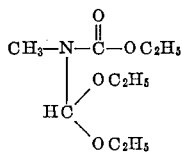

9. A method for the preparation of a urethane which comprises contacting an orthocarboxylic acid ester with an organic isocyanate of the formula $$R(NCO)_m$$

wherein R is selected from the group consisting of aliphatic, cycloaliphatic and aromatic radicals and $m$ is an integer of from 1 to 4, in the presence of a Friedel-Crafts catalyst, said orthocarboxylic acid ester derived from an alcohol containing at least one hydroxyl group and having from 1 to 18 carbon atoms and an orthocarboxylic acid.

10. A method for the preparation of a composition having the following general formula:

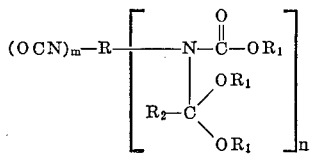

wherein R is selected from the group consisting of aliphatic, cycloaliphatic and aromatic radicals; the $R_1$'s are selected from the group consisting of lower alkyl, cycloalkyl having from 4 to 6 carbon atoms and mononuclear aryl radicals; $R_2$ is selected from the group consisting of hydrogen lower alkyl and mononuclear aryl radicals; $m$ is an integer of from 0 to 3; $n$ is an integer of from 1 to 4 and the sum of $m$ and $n$ is equal to the valence of R, which comprises contacting an orthocarboxylic acid ester with a composition containing active NCO groups in the presence of a Friedel-Crafts catalyst.

11. A method for the preparation of a composition having the following general formula:

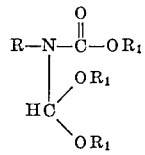

wherein R is selected from the group consisting of aliphatic, cycloaliphatic, and aromatic radicals; the $R_1$'s are selected from the group consisting of lower alkyl, cycloalkyl having from 4 to 6 carbon atoms and mononuclear aryl radicals which comprises contacting an orthocarboxylic acid ester with a composition containing active NCO groups in the presence of a Friedel-Crafts catalyst.

12. The method of claim 9 wherein said isocyanate is methyl isocyanate and said orthocarboxylic acid ester is ethylorthoformate.

13. The method of claim 9 wherein said isocyanate is propyl isocyanate and said orthocarboxylic acid ester is ortho formic acid triethyl ester.

14. The method of claim 9 wherein said isocyanate is phenyl isocyanate and said orthocarboxylic acid ester is triethyl orthoformate.

References Cited by the Examiner

UNITED STATES PATENTS

| | | | |
|---|---|---|---|
| 1,964,654 | 6/1934 | Ulrich | 260—471 |
| 2,409,712 | 10/1946 | Schweitzer | 260—482 |
| 2,520,586 | 8/1950 | Weber et al. | 260—471 |
| 2,840,484 | 6/1958 | Gerbaux | 260—471 |
| 2,939,851 | 6/1960 | Orchin | 260—482 |
| 2,947,714 | 8/1960 | Leclercq et al. | 260—482 |
| 2,950,312 | 8/1960 | Quadflieg | 260—482 |
| 2,995,573 | 8/1961 | Stansbury et al. | 260—340.9 |
| 3,064,035 | 11/1962 | de Benneville | 260—465.4 |
| 3,086,025 | 4/1963 | Tinsley et al. | 260—340.9 |
| 3,090,803 | 5/1963 | Stansbury et al. | 260—465.4 |

LORRAINE A. WEINBERGER, *Primary Examiner.*

NICHOLAS S. RIZZO, DANIEL D. HORWITZ,
*Examiners.*

D. M. KERR, A. P. HALLUIN, *Assistant Examiners.*